United States Patent [19]

Tsai

[11] Patent Number: 6,052,186
[45] Date of Patent: Apr. 18, 2000

[54] DUAL LASER SYSTEM FOR EXTENDED HETERODYNE INTERFEROMETRY

[75] Inventor: John C. Tsai, Saratoga, Calif.

[73] Assignee: Excel Precision, Inc., Santa Clara, Calif.

[21] Appl. No.: 09/187,434

[22] Filed: Nov. 5, 1998

Related U.S. Application Data

[60] Provisional application No. 60/064,534, Nov. 5, 1997.

[51] Int. Cl.[7] ................................................ G01B 9/02
[52] U.S. Cl. .......................................... 356/349; 356/350
[58] Field of Search .................... 356/349, 351, 356/358, 363

[56] References Cited

U.S. PATENT DOCUMENTS

| | | | |
|---|---|---|---|
| 4,006,989 | 2/1977 | Andringa | 356/350 |
| 4,907,886 | 3/1990 | Dandliker | 356/349 |
| 4,912,530 | 3/1990 | Bessho | 356/349 |
| 5,784,161 | 7/1998 | Bechstein et al. | 356/349 |

*Primary Examiner*—Samuel A. Turner
*Attorney, Agent, or Firm*—Hickman Stephens Coleman & Hughes, L.L.P.

[57] ABSTRACT

The present invention is a laser system (10, 100, 200) employing paired simple lasers (12, 16) or paired Zeeman type lasers (102, 112 or 202, 204). Systems of beambenders (20, 108, 210, 212, 214), half-wave plates (106, 116), and polarizing beamsplitters (22, 104, 114, 118, 216) pair the frequency component of one laser (12, 16, 102, 112, 202, 204) with that of another to produce one or more measurement beams (24, 150, 160, 228, 230) having orthogonally polarized frequency components. Systems of beamsplitters (26, 120, 124, 218, 220) and photodetectors (30, 122, 126, 206, 208) provide reference information about the frequency difference (196, 198) between the respective frequency components in the measurement beams (24, 150, 160, 228, 230). The frequency difference (196, 198) is tunable across a wide range, specifically including 4 MHz to 40 MHz when the lasers (12, 16, 102, 112, 202, 204) are conventional He—Ne types.

30 Claims, 4 Drawing Sheets

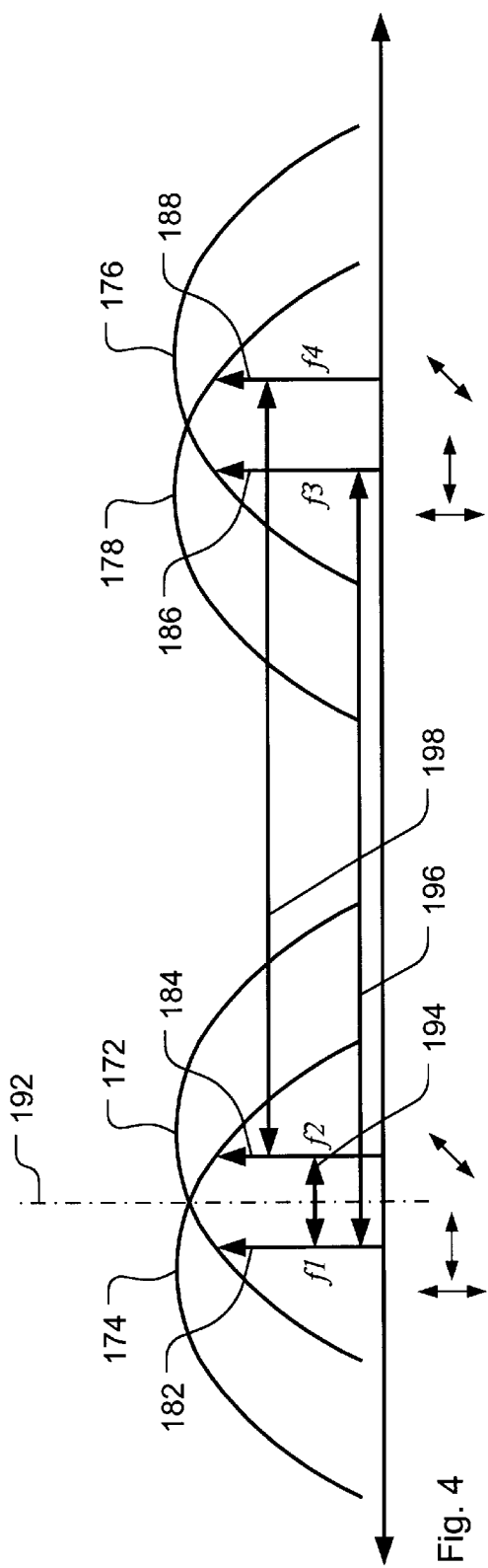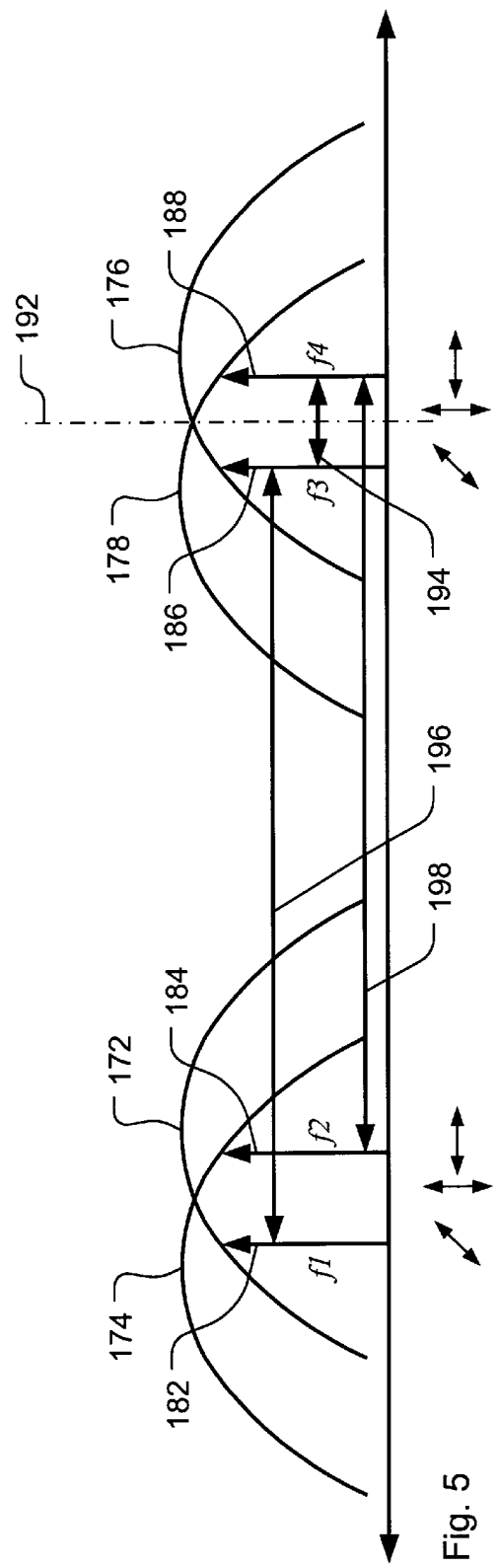

DUAL LASER SYSTEM FOR EXTENDED HETERODYNE INTERFEROMETRY

CROSS-REFERENCE TO RELATED APPLICATIONS

This application claims priority from U.S. provisional application Ser. No. 60/064,534, titled Dual Zeeman Laser Interferometer, by John C. Tsai, filed Nov. 5, 1997, and which is hereby incorporated in its entirety.

TECHNICAL FIELD

The present invention relates generally to interferometry used in displacement measurement, and more particularly to the use of Zeeman type lasers to extend the possible range of such measurement.

BACKGROUND ART

The use of interferometry to measure changes in lengths, distances, and optical paths is well known in industry. Collectively such practice can be termed interferometric displacement measurement. In performing such measurement both homodyne and heterodyne techniques may be used, with the latter having come to be overwhelmingly preferred today. Of present interest are heterodyne interferometry techniques using two optical frequencies, and preferably using frequencies produced with single laser devices.

In general, in a single mode laser only one frequency of oscillation may be produced. In order to allow more than one frequency to oscillate simultaneously, new boundary conditions have to be introduced into the laser resonator so that more than one gain media is formed. The application of a magnetic field to at least part of the laser gain media is one well known way to accomplish this, and inserting a photoelastic material into a laser cavity to create birefringence and produce different optical paths is another.

When a magnetic field is applied to a single longitudinal mode laser cavity two oscillation frequencies may be produced which have orthogonal polarizations and are separated in frequency symmetrically with respect to the absolute frequency of the laser (its natural resonant frequency). This is commonly termed the Zeeman effect, and lasers using it are called Zeeman lasers. In a Zeeman laser the magnetic field may be applied along the same direction as the axis of the laser resonator (axially or longitudinally) or perpendicular to the axis of to the laser resonator (transversely).

For axial type Zeeman lasers the frequency components produced have opposite circular polarizations and maximum frequency split is typically a few megahertz, e.g., for He—Ne lasers approximately 4 MHz. For transverse type Zeeman lasers the frequency components produced have opposite linear polarizations and the maximum frequency split is typically only a few kilohertz, e.g., for He—Ne lasers approximately 300 KHz. He—Ne lasers are used herein as examples. However it should be appreciated that the Zeeman effect may be obtained in other laser mediums and that the present invention may therefore also use such alternate mediums.

The split dual frequencies obtainable with Zeeman lasers are particularly useful for interferometric displacement measurement using heterodyne techniques. A key benefit is that the Zeeman split is symmetric with respect to the absolute frequency, which can be determined very precisely for the particular laser medium used. It follows that the frequency for each frequency component can also be precisely determined. Zeeman lasers also achieve high signal-to-noise ratios. In interferometric displacement measurement these characteristics permit the interference fringes produced by the motion of a target object to be accurately measured, and the total displacement of the target may be calculated by integrating the total number of such fringes through time. This method of displacement measuring is accurate and reliable, and has found wide use in industry.

One way to increase the frequency split produced by Zeeman type lasers is to apply a stronger magnetic field to the laser resonator. However, there are practical limits to this. As the magnetic field is made increasingly strong a point is reached at which the gain media starts to behave in a non-linear fashion, and second order Zeeman effects then cause unwanted modes and frequencies to appear. This confuses the detectors used in interferometer systems. Overly strong magnetic fields also push the gain of the media away from the absolute frequency, dramatically decreasing the laser power produced, until the point at which lasing stops entirely. Thus, there is an upper limit to the frequency split obtainable using the Zeeman effect.

In displacement interferometry this the maximum obtainable frequency split imposes a limit on target speed during measurement (velocity=2 * wavelength * Doppler frequency). For example, if a measurement target object is moved such that the Doppler effect causes a decrease in the frequency split, the measured frequency can decrease all the way to zero and the interferometer can cease to function. For axial He—Ne Zeeman lasers the maximum target movement rate, commonly called the "slew rate", is approximately 1.2 m/sec. For transverse He—Ne Zeeman lasers the maximum slew rate is considerably less (<0.1 m/sec). Today axial He—Ne Zeeman lasers are widely used in industry, but it is becoming increasingly desirable to perform displacement measurement using still higher slew rates.

Other techniques than the Zeeman effect can also create multiple frequencies. One well known example is insertion of a photoelastic material into a laser cavity to add birefringence. However, such other techniques generally also suffer a common shortcoming: they have a minimum obtainable frequency split of approximately 40 MHz, which is simply not practical for use in most current interferometry applications. Thus, current techniques are not able to produce split dual frequencies fi)r interferometry in a range extending roughly from 4 MHz to 40 MHz.

Accordingly, new techniques for achieving split dual frequencies for interferometric measurement are needed, particularly ones which produce frequency splits in the range from 4 MHz to 40 MHz.

DISCLOSURE OF INVENTION

Accordingly, it is an object of the present invention to provide a laser system capable of producing multiple frequencies which are separated by a few hundreds of kilohertz to a few tens of megahertz, preferably in a manner tunable across such a wide range.

Another object of the invention is to provide a laser system capable of producing multiple frequencies which are all determinable to a high degree of precision.

Another object of the invention is to provide a laser system capable of producing multiple frequencies, yet which may be stabilized and provide a high degree of repeatability.

And, another object of the invention is to provide such a laser system meeting the above objectives, yet employing widely used and well understood types of laser equipment, such as that used in conventional He—Ne gas laser systems today.

Briefly, one preferred embodiment of the present invention is a system for producing a two output beams and two frequency difference references for use in interferometric measurement. Include are two suitable lasers which each produce a source beam of light including two frequency components having orthogonal polarizations. A first polarizing-beamsplitter receives one source beam, and based upon the respective polarizations, passes one of its frequency components and redirects the other. The polarization of the redirected frequency component is then reve-sed. A second polarizing-beamsplitter receives the other source beam, and based upon the respective polarizations, also passes one of its frequency components and redirects the other. The polarization of the passed frequency component here is then reversed. A third polarizing-beamsplitter receives the passed frequency component from the first polarizing-beamsplitter (having its polarization unchanged) and also the passed frequency component from the second polarizing-beamsplitter (having its polarization now changed). The third polarizing-beamsplitter combines these frequency components to produce one output beam. The second polarizing-beamsplitter receives also receives the redirected frequency component from the first polarizing-beamsplitter, and combines it with the frequency component which it redirects to produce the second output beam. Two simple beamsplitters then respectively receive the light beams and direct sample portions of each into a respective photodetector, to detect the respective frequency difference references.

A second preferred embodiment is similar to the first, except that only one output beam and one frequency difference reference are produced, for use in interferometric measurement where such is sufficient. Included, again, are two suitable lasers which each produce a source beam of light including two frequency components having orthogonal polarizations. A first polarizing-beamsplitter receives one source beam, and based upon the respective polarizations, again passes one of its frequency components and redirects the other. Unlike the previous embodiment, by suitabe arrangement of the laser producing this source beam, the polarization of the redirected frequency component need not be changed. A second polarizing-beamsplitter receives the other source beam, and here also based upon the respective polarizations, passes one of its frequency components and redirects the other. Unlike the previous embodiment, here the frequency components passed by the first and second polarizing-beamsplitters may simply be discarded, they are not needed. The second polarizing-beamsplitter receives the redirected frequency component from the first polarizing-beamsplitter and combines it with the frequency component which it redirects to produce the output beam. A simple beamsplitter then receive the light beam and directs :ample portions of it into a photodetector, to detect the frequency difference reference.

A third preferred embodiment employs the same underlying invention in a different system for producing a two output beams and two frequency difference references for use in interferometric measurement. Included are two suitable lasers which each produce a source beam of light including two frequency components having orthogonal polarizations. A polarizing-beamsplitter receives both source beams, and passes one frequency component from each in different directions, and redirects one frequency component form each in the same directions as the other frequency components. The passed frequency component and the redirected frequency component going in one direction combine to form one output beam, and the passed frequency component and the redirected frequency component going in the other direction combine to form the other output beam. Two simple beamsplitters then respectively receive the light beams and direct sample portions of each into a respective photodetector, to detect the respective frequency difference references.

And a fourth preferred embodiment is similar to the third, except here again only one output beam and one frequency difference reference are produced, for use in interferometric measurement where such is again sufficient. Included, again, are two suitable lasers each producing a source beam of light including two frequency components having orthogonal polarizations. A polarizing-beamsplitter receives both source beams, and passes one frequency component from each in different directions, and redirects one frequency component form each in the same directions as the other frequency components. One passed frequency component and one redirected frequency component going in one direction combine to form the output beam. Unlike the third embodiment, here the other frequency components may be discarded, since they are not needed. A simple beamsplitter then receive the light beam and directs sample portions of it into a photodetector, to detect the frequency difference reference.

An advantage of the present invention is that it can produce multiple frequencies across a very wide range of tunable of frequency separations. Specifically, using entirely conventional He—Ne Zeeman type lasers, the invention can provide frequency separations in the range of 4 MHz to 40 MHz.

Another advantage of the invention is that the frequencies produced can be easily and very accurately determined when Zeeman type lasers are used.

Another advantage of the invention is that conventional laser stabilization techniques can be used therein to obtain very high repeatability of the frequencies produces and the separations therebetween.

And, another advantage of the invention is that the frequencies produced have orthogonal polarization relationships, which greatly facilitates their use in interferometric measurement applications.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIG. 4 is a graph depicting gain curves and frequency component details for the embodiment of FIG. 4;

FIG. 5 is a graph epicting gain curves and frequency component details for possible alternate embodiments based on the embodiment of FIG. 4.

BEST MODE FOR CARRYING OUT THE INVENTION

Figure 1:
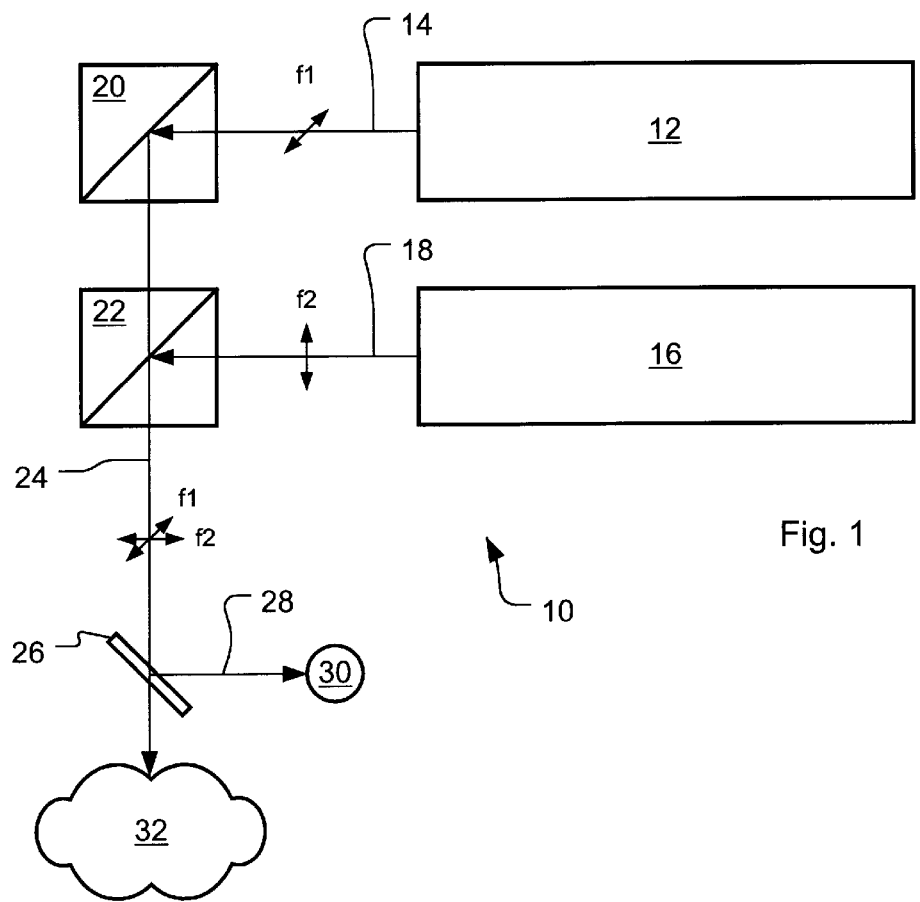
FIG. 1 is a schematic diagram of a simple non-Zeeman laser based system employing the principles of the invention.
Figure 3:
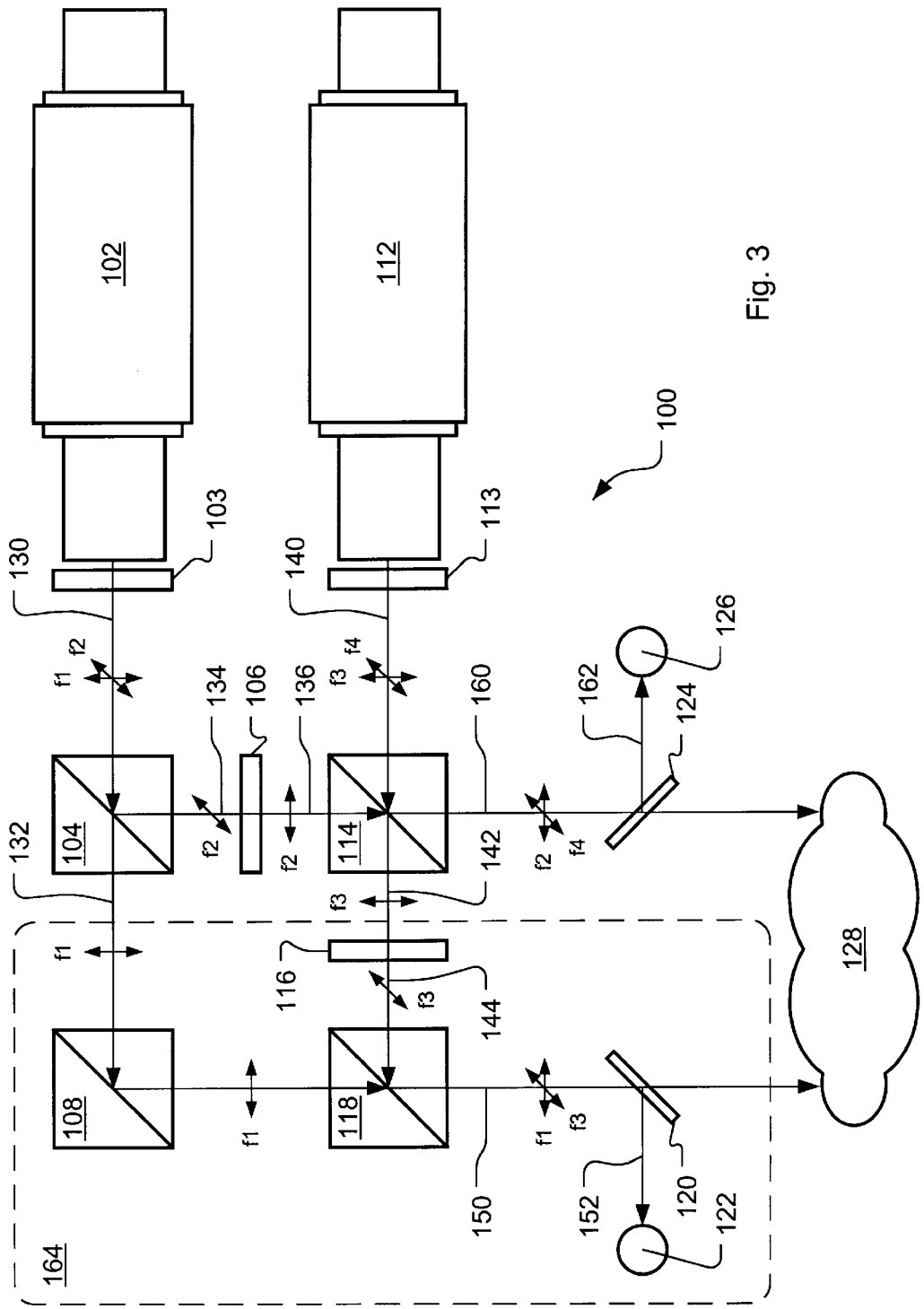
FIG. 3 is a schematic diagram of a first Zeeman laser based embodiment of the present invention.
Figure 6:
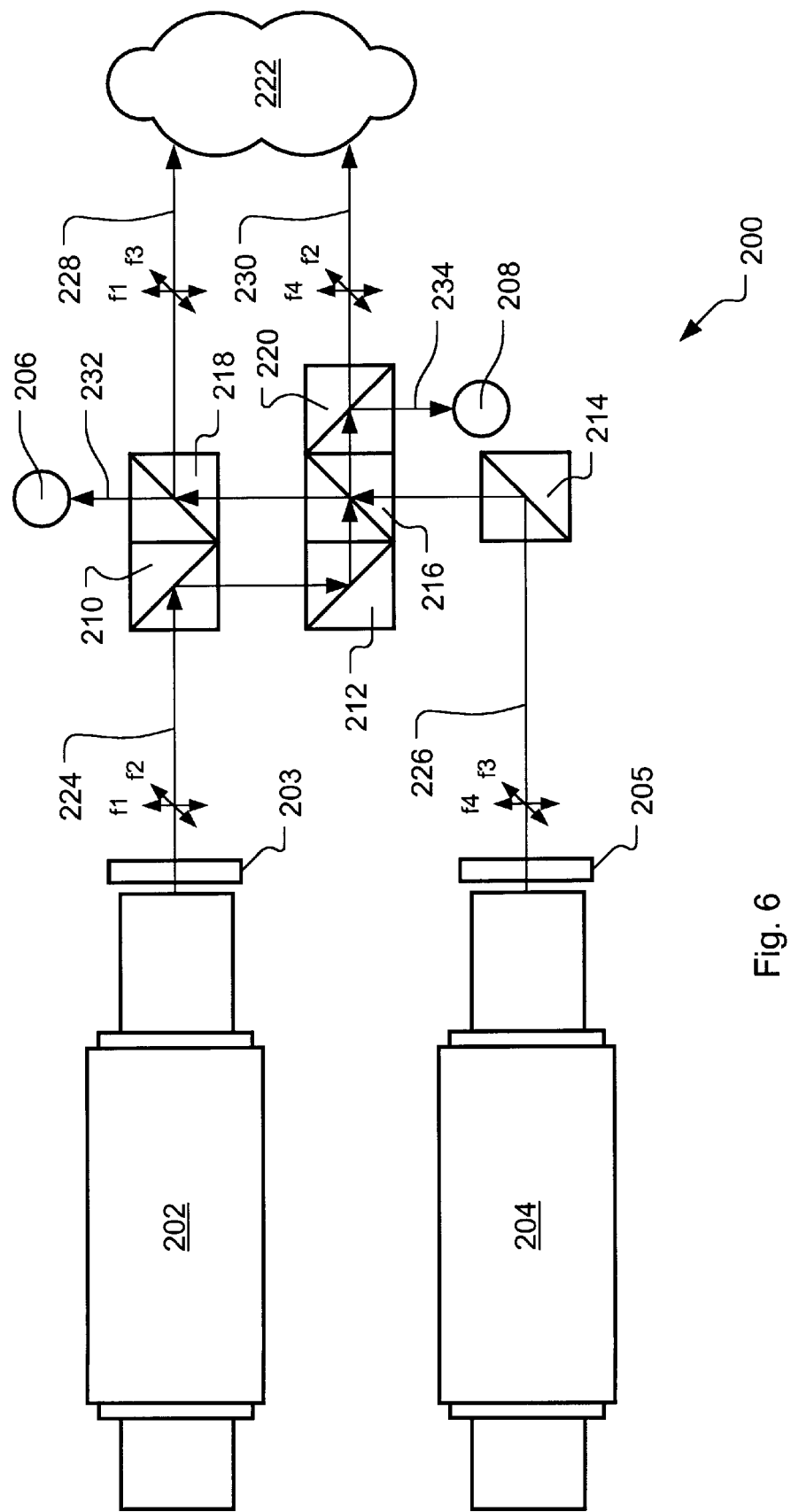
FIG. 6 is ahematic diagram of a second Zeeman laser based embodiment of the present invention.

Preferred embodiments of the present invention are laser systems for use in interferometry. A simplified non-Zeeman based embodiment is illustrated in FIG. 1, where it is depicted by the general reference character 10. A first preferred embodiment of the inventive laser system is illustrated in FIG. 3, where it is depicted by the general reference character 100. And a second preferred embodiment of the inventive laser system is illustrated in FIG. 6, where it is depicted by the general reference character 200.

FIG. 1 is a schematic diagram depicting a laser system 10 which illustrates some basic principles of the invention, but which does not employ lasers using the Zeeman effect. A first laser 12 provides a beam 14 having a single frequency component f1, which is linearly polarized in the horizontal direction (depicted here by a diagonal dual-arrowed line). A second laser 16 provides a beam 18 having a single frequency component f2, which is linearly polarized in the vertical direction (depicted here by a vertical dual-arrowed line).

The beam 14 is directed into and redirected by a beambender 20 (discussion of FIG. 6, below, explains that the beambender 20 is not required, but often desirable). The beam 18 is directed into a polarizing cube beamsplitter 22. The polarizing cube beamsplitter 22 is placed and suitably oriented to receive the beam 14 and to pass it (due to its horizontal polarization), while also receiving and redirecting the beam 18 (due to its vertical polarization). The two beams (14 and 18) are thus combined by the polarizing cube beamsplitter 22 into a measurement beam 24, having both a horizontally polarized f1 frequency component (still depicted by a short diagonal dual-arrowed tine) and a vertically polarized f2 frequency component (now depicted by a short horizontal dual-arrowed line).

A beamsplitter 26 is placed in the path of the measurement beam 24, and directs a sample portion 28 of it into a photodetector 30. This sample portion 28 includes an interference beat frequency of f2−f1 which is measurable (unlike the much higher f1, f2 and f1+f2 frequencies, which are also present). The photodetector 30 detects this beat frequency for use as a precise reference, and it along with the measurement beam 24 are then usable in entirely conventional manner in interferometic measurement in a measurement stage 32. (Additional measurement stage 32 elements, such as reflective targets, detectors, and optics are not shown in FIG. 1, since such will vary widely in actual application and may be entirely conventional.)

Figure 2:
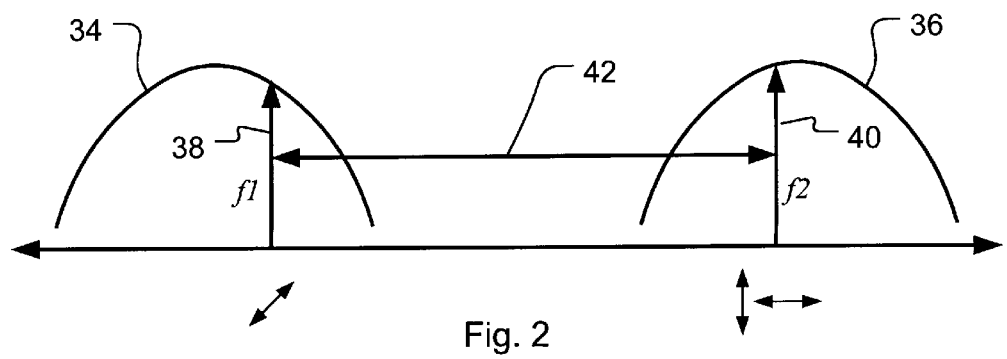
FIG. 2 is a graph depicting gain curves and frequency component details for the embodiment of FIG. 1.

FIG. 2 is a graph in which the horizontal axis represents frequency and the vertical axis represents laser beam power (as is the case for all graphs herein). A gain curve 34 is graphed for first laser 12, and a gain curve 36 is similarly graphed for second laser 16. The frequency component f1 is represented by an arrowed line 38, and the frequency component f2 is similarly represented by an arrowed line 40. A horizontal dual-arrowed line 42 depicts that f1 and f2 are "locked" together in this embodiment, i.e., the length of arrow line 42 reflects the reference detected at the photodetector 30.

The embodiment of FIG. 1 and 2 has the advantage of simplicity, but it also has major disadvantages. Unlike Zeeman lasers, which have a very precisely ascertainable center frequency (also commonly termed "absolute frequency") from which the respective frequency components are always symmetricaly offset, there is no such "reference" here. The lasers (12 and 16) can lase anywhere along their respective gain curves (34 and 36). Of course, one laser (12 or 16) can be designated a master and the other locked to it by use of the photodetector 30, but there is still no simple way here of determining what the frequencies obtained actually are. This is particularly a problem because the lasers (12 and 16) here have no means to assure repeatability. Every time they are powered up the respective frequencies can settle at different locations on the gain curves (34 and 36), as FIG. 2 also depicts.

FIG. 3 is a schematic diagram depicting a first preferred embodiment of a laser system 100 using the present invention. Included are a first laser 102, a first quarter-wave plate 103, a first polarizing cube beamsplitter 104, a first half-wave plate 106, a beambender 108, a second laser 112, a second quarter-wave plate 113, a second polarizing cube beamsplitter 114, a second half-wave plate 116, a third polarizing cube beamsplitter 118, a first beamsplitter 120, a first photodiode 122, a second beamsplitter 124, and a second photodiode 126. (Conventional elements such as reflective targets, detectors, and optics used in a measurement stage 128 are not shown.)

The lasers (102 and 112) here are both frequency-stabilized Zeeman types having magnetic fields applied axially with respect to the laser resonators. Each respectively produces two opposed frequency components which are herein designated f1 and f2 for the first laser 102, and f3 and f4 for the second laser 112. Although not required, for convenience in the following discussion the first and second lasers (102 and 112) are assumed to be arranged such that f1<f2<f3<f4, i.e. as depicted in FIG. 4. The center frequencies of the lasers (102 and 112) are tuned such that the frequency differences between f1 and f3, and also between f2 and f4, are large enough that when displacement measurement is performed the Doppler shift does not decrease to zero at speeds less than the desired maximum slew rate. For example, if the center frequencies of the lasers (102 and 112) are tuned 10 MHz apart, then f3−f1=10 MHz and f4−f2=10 MHz, before any Doppler shifting. This permits a maximum slew rate of approximately 3 m/sec in a single pass interferometric displacement measurement system using this embodiment of the invention.

As is characteristic for axial Zeeman type lasers, the frequency components, f1, f2, f3, and f4, are initially circularly polarized. For ultimate use in interferometry in the measurement stage 128 this is not desirable, so the quarter-wave plates (103 and 113) are provided to immediately convert the circularly polarizations to linear ones. However, this could also be done at any point in the inventive laser system 100 or in the measurement stage 128 using it. This results in a beam 130 from the first laser 102 including an f1 component having now having vertical linear polarization (depicted here, in various stages, as short vertical and horizontal dual-arrowed lines) and an f2 component having a horizontal linear polarization (depicted here, consistently, as a short diagonal dual-arrowed line). By initial arrangement of the lasers (102 and 112), the linear polarizations of f1 and f3 are now parallel, and the same is the case for f2 and f4.

The first polarizing cube beamsplitter 104 is oriented to accept the beam 130 and to pass the f1 component while redirecting the f2 component. The f1 component thus exits as a first modified beam 132, which travels onward to and is redirected by the beambender 108. The f2 component similarly exits as a second modified beam 134, which passes through the first half-wave plate 106 and becomes a further modified beam 136, but now instead having horizontal polarization.

The second laser 112 and the second quarter-wave plate 113 produce a beam 140 including a f3 component having vertical polarization and a f4 component having horizontal polarization (the same is for the first laser 102 and the first quarter-wave plate 103). The second polarizing cube beamsplitter 114 is oriented to accept the beam 140 and to pass the f3 component, while redirecting the f4 component (the same as for the first polarizing cube beamsplitter 104). The f3 component thus exits as a modified beam 142 which passes through the second half-wave plate 116 and becomes a further modified beam 144, but now instead having horizontal polarization. The f4 component contributes to a second measurement beam 160, described below.

The third polarizing cube beamsplitter 118 is oriented to accept both beams 132 and 144, and to combine them into a first measurement beam 150 having the f1 component (still in vertical polarization) and the f3 component (now in horizontal polarization). This first measurement beam 150 travels through the first beamsplitter 120, where a first sample portion 152 is diverted into the first photodiode 122, and the balance travels onward into the measurement stage 128.

The second polarizing cube beamsplitter 114, in addition to being oriented as described above, is also oriented to accept the beam 136, having the f2 component (now in vertical polarization), and to combine it with the f4 component (still in horizontal polarization) to form a second measurement beam 160. This second measurement beam 160 travels through the second beamsplitter 124, where a second sample portion 162 is diverted into the second photodiode 126, and the balance travels onward into the measurement stage 128.

The first measurement beam 150 includes a beat frequency of f3−f1, which is measurable, and from the first sample portion 152 which is diverted into the first photodiode 122 a precise value for this may be derived for use as a reference. Similarly, the second measurement beam 160 includes a beat frequency of f4−f2, which is measurable, and from the second sample portion 162 which is diverted into the second photodiode 126 a precise value for this may also be derived for use as a reference.

The measurement beams (150 and 160) and the respective reference values derived from the sample portions (152 and 162) can now be used in entirely conventional manner in interferometric measurement in the measurement stage 128. For example, the measurement beams (150 and 160) may be used to track an X-Y stage in a semiconductor manufacturing process or to control mill table movement in two dimensions in a machine shop. Of course, if measurement is desired in only one dimension, all of the elements enclosed in region 164 in FIG. 3 can simply be omitted.

FIG. 4 is a graph of the gain curves and frequency relationships for the lasers (102 and 112) of the embodiment presented in FIG. 3, assuming the first laser 102 to be the master. The gain relationships of frequency components f1 and f2, from the first laser 102, are respectively shown by gain curves 172 and 174. Similarly, the gain relationships of frequency components f3 and f4, from the second laser 112 are respectively shown by gain curves 176 and 178. Arrowed lines 182, 184, 186, and 188 depict a typical set of the frequency components, f1, f2, f3, and f4, which the Zeeman effect characteristically produces in lasers having axially applied magnetic fields. Short dual-arrowed lines below these depict the linear polarizations present after the quarter-wave plates (103 and 113) (vertical-horizontal indicating vertical polarization and diagonal indicating horizontal polarization).

The Zeeman effect also insures that the frequency components produced are precisely centered about an absolute frequency, depicted here by a center-line 192 for the first laser 102 (the master). An intermediate sized horizontal dual-arrowed line 194 illustrates that f1 and f2 are frequency stabilized in this embodiment. (Sampling and stabilizing components are not shown in the figures. Techniques for this are conventional. For example, a third beamsplitter and a third photodiode can sample the beam 130 from first laser 102, and drive a heater or piezoelectric stabilizer unit.) In FIG. 4, a long horizontal dual-arrowed line 196 depicts that f1 and f3 are here locked together, by use of the reference provided by the first photodiode 122. Alternately, f2 and f4 could be locked, shown by a long dual-arrowed line 198, by use of the reference provided by the second photodiode 126.

FIG. 5 illustrates some alternate arrangements of the frequency components and polarizations (intentionally reusing the element numbers used in FIG. 4 to emphasize that the underlying principles remain the same). Here, the second laser 112 is frequency stabilized and used as the master. On frequency component from the first laser 102 is locked to a frequency component of the second laser 112, and opposite polarizations are used. It should readily be appreciated that modifying the embodiment of the inventive laser system 100 depicted in FIG. 3 to operate in the manner depicted in FIG. 5 is merely an exercise in changing element orientations.

Ultimately, it is desirable that the measurement beams (150 and 160) each include two polarizations, so that one can be used as a reference beam and the other as a measuring beam in the measurement stage 128 (where these are separated by the interferometer used there). Ideally, it is therefore desirable to have the polarization of f3 be perpendicular to f1 (and f4 perpendicular to f2). This can be achieved by having polarizations as shown in FIG. 4 and 5, and using a half-wave plate to rotate f3 and f4 by 90 degrees (since FIG. 4 and 5 show the polarizations of f3 parallel to f1, and f4 parallel to f2). Alternately, this can be done by applying the magnetic fields for the two lasers (102 and 112) anti-parallel to each other.

FIG. 6 is a blocs diagram depicting a second preferred embodiment of a laser system 200 using the present invention. Included are a first laser 202, a first quarter-wave plate 203, a second laser 204, a second quarter-wave plate 205, a first photodetector 206, a second photodetector 208, a first beambender 210, a second beambender 212, a third beambender 214, a polarizing cube beamsplitter 216, a first non-polarizing beamsplitter 218, and a second non-polarizing beamsplitter 220. Elements such as reflective targets, detectors, and optics used in an ultimate measurement stage 222 are again not specifically shown.

The lasers (202 and 204) are again both frequency-stabilized Zeeman types having magnetic fields applied axially with respect to the resonators. Opposed circularly polarized components f1 and f2, and f3 and f4, are again respectively produced, and by the quarter-wave plates (203 and 205) here also converted to linear polarizations. The polarizations of f1 and f3, and f2 and f4, are here perpendicular (and thus f1 and f4, and f3 and f2, are parallel; both unlike the first preferred embodiment discussed previously). For discussion purposes only, it is again assumed that f1<f2<f3<f4. The center frequencies of the lasers (202 and 204) are tuned to produce frequency differences between f1 and f3, and f2 and f4, which are large enough to prevent Doppler shifting decreasing to zero at speeds less than the desired maximum slew rate.

The first laser 202 and the first quarter-wave plate 203 produce a beam 224 including an f1 component having vertical polarization and an f2 component having horizontal polarization. However, the second laser 204 and the second quarter-wave plate 205 here produce a beam 226 including an f3 component having horizontal polarization and an f2 component having vertical polarization. The beam 224 is directed into the first beambender 210, redirected by it into the second beambender 212, and there redirected further into the polarizing cube beamsplitter 216. The beam 226 is directed into the third beambender 214, and redirected by it into the polarizing cube beamsplitter 216.

The polarizing cube beamsplitter 216 is oriented to accept both beams 224 and 226, and further oriented such that f2 and f3 are passed through, while f1 and f4 are redirected. The f1 and f3 components thus combine to form a first measurement beam 228, and the f2 and f4 components combine to form a second measurement beam 230.

The first measurement beam 228 is directed into the first non-polarizing beamsplitter 218, which is oriented to pass a sample portion 232 into the first photodetector 206, where the difference between f1 and f3 is detectable in conventional manner for use as a frequency difference reference with respect to the first measurement beam 228. The first non-polarizing beamsplitter 218 further redirects the rest of the first measurement beam 228 into the measurement stage 222 for use in interferometric measurement.

Similarly, the second measurement beam 230 is directed into the second non-polarizing beamsplitter 220, which is oriented to redirect a sample portion 234 into the second photodetector 208, where the difference between f2 and f4 is detectable in conventional manner for use as a frequency difference reference with respect to the second measurement beam 230. The second non-polarizing beamsplitter 220 further passes the rest of the second measurement beam 230 into the measurement stage 222 for use in interferometric measurement.

One skilled in the relevant arts will readily appreciate that the embodiment of FIG. 6 can be simplified. The beambenders (210, 212, and 214) can all be omitted. The first laser 202 can be positioned and aimed to direct the beam 224 directly into the polarizing cube beamsplitter 216. And the second laser 204 can be positioned (rotated) and aimed to direct the beam 226 also directly into the polarizing cube beamsplitter 216. However, this is considered somewhat undesirable by the inventor because it makes for larger overall construction and exacerbates cooling and electronic shielding concerns with regard to the lasers (202 and 204).

Further, if only a single measurement beam and frequency difference reference are desired, it is a simple aid, in view of the teachings herein, obvious exercise to construct such an embodiment by omitting one of the non-polarizing beamsplitters and one of the photodetectors.

In addition to the above mentioned examples, various other modifications and alterations of the invention may be made without departing from the invention. Accordingly, the above disclosure is not to be considered as limiting and the appended claims are to be interpreted as encompassing the true :spirit and the entire scope of the invention.

INDUSTRIAL APPLICABILITY

The present invention is well suited for application in a wide variety of applications currently or potentially employing interferometric measurement. As has been described for the embodiments of the laser systems (10, 100, and 200) discussed herein, the present invention produces one or more measurement beams (24, 150, 160, 228, and 230) which may exhibit an until now unobtainable split between frequency components (f1 and f2, for laser system 10; and f1 and f3, and f2 and f4, for laser systems 100 and 200).

Simple non-Zeeman laser based techniques have lacked the ability to produce measurement beams having stable, repeatable, and precisely discernable frequencies (both with respect to center frequency and any frequency components present). Zeeman laser based techniques overcome these limitations, but introduce others in their place. Prior Zeeman laser techniques are limited by the maximum split between frequency components being only a few megahertz for axial magnetic field Zeeman lasers, e.g., 4 MHz for He—Ne, and only a few kilohertz for transverse magnetic field Zeeman lasers, e.g., 300 KHz for He—Ne. More complex techniques do exist, but are limited by the minimum splits between frequency components being many tens of megahertz, 40 MHz for birefringent crystal plate tuning of non-Zeeman He—Ne lasers. Thus, for laser systems suitable for measurement, i.e., those able to produce beams having stable, repeatable, and precisely knowable frequency characteristics, there has existed a gap in obtainable frequency component splits of approximately 4 MHz to 40 MHz.

This gap today is an obstacle to increasing precision and efficiency in processes in many fields. For example, in storage device and semiconductor manufacturing, and in precision machining, in general, it is highly desirable to move tools and workpieces at higher and higher speeds. Unfortunately, when using preferred heterodyne techniques, the Doppler effect and a frequency split maximum of 4 MHz limits the slew rate (the maximum movement rate) to barely 1.2 meters per second, which is slower than is now possible and desirable in many cases. Conversely, a minimum speed of 12 meters per second in most cases is obviously not acceptable.

The present invention overcomes such limitations. It permits the continued use of well known and widely used technology, such as Doppler shift heterodyne techniques and cheap He—Ne gas lasers. It may employ non-Zeeman lasers, such as in laser system 10, where such is acceptable. Alternately it may use Zeeman lasers, such as in laser systems 100 and 200, to obtain desired stable, repeatable, and precisely knowable characteristics. And all of this is now made possible across a very wide range of frequencies, which easily now includes 4 MHz to 40 MHz.

Accordingly, for the above and other reasons, it is expected that the present invention will have widespread industrial applicability, and it is expected that the commercial utility of the present invention will be extensive and long lasting.

What is claimed is:

1. An apparatus for producing a first output beam and a first frequency difference reference, and a second output beam and a second frequency difference reference, for use in interferometric measurement, the apparatus comprising:

a first laser suitable to produce a first source beam of light including a first frequency component and a second frequency component having orthogonal polarizations;

a second laser suitable to produce a second source beam of light including a third frequency component and a fourth frequency component having orthogonal polarizations;

a first polarizing-beamsplitter suitably positioned to receive said first source beam and based upon the respective polarizations to pass said first frequency component and redirect said second frequency component;

a first polarization reverser suitably positioned to receive and reverse the polarization of said second frequency component;

a beambender suitably positioned to receive and redirect said first frequency component;

a second polarizing-beamsplitter suitably positioned to receive said second source beam and based upon the respective polarizations pass said third frequency component and redirect said fourth frequency component;

a second polarization reverser suitably positioned to receive and reverse the polarization of said third frequency component;

a third polarizing-beamsplitter suitably positioned to receive and pass said first frequency component and receive and redirect said third frequency component, based upon the respective polarizations, such that said first frequency component and said third frequency component form the first light beam;

said second polarizing-beamsplitter further suitably positioned to receive and based upon its polarization pass said second frequency component, such that said second frequency component and said fourth frequency component form the second light beam;

a first beamsplitter suitably positioned to receive the first light beam and redirect a first sample portion to a first photodetector, to detect the first frequency difference reference as the frequency difference between said first frequency component and said third frequency component; and a second beamsplitter suitably positioned to receive the second light beam and redirect a second sample portion to a second photodetector, to detect the second frequency difference reference as the frequency difference between said second frequency component and said fourth frequency component.

2. The apparatus of claim 1, wherein said first frequency component, said second frequency component, said third frequency component, and said fourth frequency component have circular polarizations, the apparatus further comprising:

a first polarization converter, to convert said first frequency component and said second frequency component to opposed linear polarizations; and a second polarization converter, to convert said third frequency component and said fourth frequency component to opposed linear polarizations.

3. The apparatus of claim 2, wherein:

said first polarization converter is placed between said first laser and said first polarizing-beamsplitter; and said second polarization converter is placed between said second laser and said second polarizing-beamsplitter.

4. The apparatus of claim 2, wherein:

said first polarization converter and said second polarization converter each include a quarter-wave plate.

5. The apparatus of claim 1, wherein:

said first laser and said second laser are members of the set consisting of axial and transverse Zeeman type lasers.

6. The apparatus of claim 1, wherein:

said first polarization reverser and said second polarization reverser each include a half-wave plate.

7. An apparatus for producing an output beam and a frequency difference reference for use in interferometric measurement, the apparatus comprising:

a first laser suitable to produce a first source beam of light including a first frequency component and a second frequency component having orthogonal polarizations;

a second laser suitable to produce a second source beam of light including a third frequency component and a fourth frequency component having orthogonal polarizations;

a polarizing-beamsplitter suitably positioned to receive said first source beam and pass said first frequency component and redirect said second frequency component based upon their respective polarizations;

a second polarizing-beamsplitter suitably positioned to receive said second source beam and pass said third frequency component and redirect said fourth frequency component based upon their respective polarizations;

said second polarizing-beamsplitter further suitably positioned to receive and said second frequency component and pass and said second frequency component based upon its polarization, such that said second frequency component and said fourth frequency component form the light beam; and a beamsplitter suitably positioned to receive the light beam and redirect a sample portion to a photodetector, to detect the frequency difference reference as the frequency difference between said second frequency component and said fourth frequency component.

8. The apparatus of claim 7, wherein said second frequency component and said fourth frequency component have circular polarizations, the apparatus further comprising:

a first polarization converter, to convert said second frequency component to linear polarization; and a second polarization converter, to convert said fourth frequency component to linear polarization.

9. The apparatus of claim 8, wherein:

said first polarization converter is placed between said first laser and said first polarizing-beamsplitter; and said second polarization converter is placed between said second laser and said second polarizing-beamsplitter.

10. The apparatus of claim 8, wherein:

said first polarization converter and said second polarization converter each include a quarter-wave plate.

11. The apparatus of claim 7, wherein:

said first laser and said second laser are members of the set consisting of axial and transverse Zeeman type lasers.

12. The apparatus of claim 7, wherein:

said first laser and said second laser are suitably oriented to produce said first source beam and said second source beam such that said second frequency component and said fourth frequency component also have orthogonal polarizations.

13. The apparatus of claim 7, wherein said second frequency component and said fourth frequency component also have equivalent polarizations, the apparatus further comprising:

a polarization reverser suitably positioned to receive said second frequency component and reverse the polarization of said second frequency component.

14. The apparatus of claim 13, wherein:

said polarization reverser includes a half-wave plate.

15. An apparatus for producing a first light beam and a first frequency difference reference, and a second light beam and a second frequency difference reference, for use in interferometric measurement, the apparatus comprising:

a first laser suitable to produce a first source beam of light including a first frequency component and a second frequency component having orthogonal polarizations;

a second laser suitable to produce a second source beam of light including a third frequency component and a fourth frequency component having orthogonal polarizations;

a polarizing-beamsplitter suitably positioned to receive said first source beam and said second source beam, and redirect said first frequency component and said fourth frequency component, and pass said second frequency component and said third frequency component, such that said first frequency component and said third frequency component for the first light beam and said second frequency component and said fourth frequency component form the second light beam;

a first beamsplitter suitably positioned to receive the first light beam and redirect a first sample portion to a first photodetector, to detect the first frequency difference reference as the frequency difference between said first frequency component and said third frequency component; and a second beamsplitter suitably positioned to receive the second light beam and redirect a second sample portion to a second photodetector, to detect the second frequency difference reference as the frequency difference between said second frequency component and said fourth frequency component.

16. The apparatus of claim 15, wherein said first frequency component, said second frequency component, said third frequency component, and said fourth frequency component have circular polarizations, the apparatus further comprising:

a first polarization converter, to convert said first frequency component and said second frequency component to opposed linear polarizations; and a second polarization converter, to convert said third frequency component and said fourth frequency component to opposed linear polarizations.

17. The apparatus of claim 16, wherein:

said first polarization converter is placed between said first laser and said polarizing-beamsplitter; and said second polarization converter is placed between said second laser and said polarizing-beamsplitter.

18. The apparatus of claim 2, wherein:

said first polarization converter and said second polarization converter each include a quarter-wave plate.

19. The apparatus Of claim 15, wherein:

said first laser and said second laser are members of the set consisting of axial and transverse Zeeman type lasers.

20. An apparatus for producing an output beam and a frequency difference reference for use in interferometric measurement, the apparatus comprising:

a first laser suitable to produce a first source beam of light including a first frequency component and a second frequency component having orthogonal polarizations;

a second laser suitable to produce a second source beam of light including a third frequency component and a fourth frequency component having orthogonal polarizations;

a polarizing-beamsplitter suitably positioned to receive said first source beam and said second source beam, and redirect said first frequency component and said fourth frequency component, and pass said second frequency component and said third frequency component, such that said first frequency component and said third frequency component form the light beam;

a beamsplitter suitably positioned to receive the light beam and redirect a first sample portion to a first photodetector, to detect the first frequency difference reference as the frequency difference between said first frequency component and said third frequency component.

21. The apparatus of claim 20, wherein said first frequency component and said third frequency component have circular polarizations, the apparatus further comprising:

a first polarization converter, to convert said first frequency component to linear polarization; and a second polarization converter, to convert said third frequency component to linear polarization.

22. The apparatus of claim 21, wherein:

said first polarization converter is placed between said first laser and first polarizing-beamsplitter; and said second polarization converter is placed between said second laser and said polarizing-beamsplitter.

23. The apparatus of claim 21, wherein:

said first polarization converter and said second polarization converter each include a quarter-wave plate.

24. The apparatus of claim 20, wherein:

said first laser and said second laser are members of the set consisting of axial and transverse Zeeman type lasers.

25. A method for producing a light beam and a frequency difference reference for use in interferometric measurement, the method comprising the steps of:

producing a first source beam of light including a first frequency component and a second frequency component having orthogonal polarizations;

producing a second source beam of light including a third frequency component and a fourth frequency component having orthogonal polarizations;

combining said first frequency component and said third frequency component to form the light beam;

measuring the interference between said first frequency component and said third frequency component in the light beam, to determine the frequency difference reference.

26. The method of claim 25, wherein:

said first source beam and said second source beam are produced by members of the set consisting of axial and transverse Zeeman type lasers.

27. The method of claim 25, wherein said step of producing said first source beam produces said first frequency component having a circular polarization, and said step of producing said second source beam produces said third frequency component having a circular polarization, the method further comprising:

converting said first frequency component a linear polarization; and converting said third frequency component to linear polarization which is opposed to that of said first frequency component.

28. A method for producing a first light beam and a first frequency difference reference, and a second light beam and a second frequency difference reference, for use in interferometric measurement, the method comprising the steps of:

producing a first source beam of light including a first frequency component and a second frequency component having orthogonal polarizations;

producing a second source beam of light including a third frequency component and a fourth frequency component having orthogonal polarizations;

combining said first frequency component and said third frequency component to form the first light beam;

combining said second frequency component and said forth frequency component to form the second light beam;

measuring the interference between said first frequency component and said third frequency component in the first light beam, to determine the first frequency difference reference; and measuring the interference between said second frequency component and said fourth frequency component in the second light beam, to determine the second frequency difference reference.

29. The method of claim 28, wherein:

said first source beam and said second source beam are produced by members of the set consisting of axial and transverse Zeeman type lasers.

30. The method of claim 28, wherein said step of producing said first source beam produces said first frequency component and said second frequency component having circular polarizations, and said step of producing said second source beam produces said third frequency component and said fourth frequency component having circular polarizations, the method further comprising:

converting said first frequency component and said second frequency component to opposed linear polarizations; and converting said third frequency component and said fourth frequency component to opposed linear polarizations.

* * * * *